United States Patent
Jandak et al.

(10) Patent No.: US 10,718,615 B2
(45) Date of Patent: Jul. 21, 2020

(54) REDUCING A GYROSCOPE-BIAS COMPONENT IN A DETERMINED VALUE OF ANGULAR VELOCITY WITH SIMULTANEOUS SENSOR OPERATION

(71) Applicant: Honeywell International Inc., Morris Plains, NJ (US)

(72) Inventors: Mikulas Jandak, Vienna (AT); Petr Zatloukal, Olomouc (CZ); Tomas Neuzil, Brno (CZ)

(73) Assignee: Honeywell International Inc., Morris Plains, NJ (US)

(*) Notice: Subject to any disclaimer, the term of this patent is extended or adjusted under 35 U.S.C. 154(b) by 84 days.

(21) Appl. No.: 15/792,183

(22) Filed: Oct. 24, 2017

(65) Prior Publication Data

US 2018/0128613 A1 May 10, 2018

Related U.S. Application Data

(60) Provisional application No. 62/419,164, filed on Nov. 8, 2016.

(51) Int. Cl.
*G01C 19/56* (2012.01)
*G01C 19/5691* (2012.01)
(Continued)

(52) U.S. Cl.
CPC ..... *G01C 19/5691* (2013.01); *G01C 19/5649* (2013.01); *G01C 19/721* (2013.01)

(58) Field of Classification Search
CPC ............................. G01C 19/5776; G01P 21/00
(Continued)

(56) References Cited

U.S. PATENT DOCUMENTS 5,375,336 A 12/1994 Nakamura
7,565,839 B2 7/2009 Stewart et al.
(Continued)

FOREIGN PATENT DOCUMENTS

EP 2098823 A1 9/2009

OTHER PUBLICATIONS

Intellectual Property Office; "Combined Search and Examination Report u nder Sections 17 and 18(3) from GB Application No. 1718147.0 dated Apr. 16, 2018"; from Foreign Counterpart of U.S. Appl. No. 15/792,183; Dated Apr. 16, 2018; pp. 1-8; Published: GB.

(Continued)

*Primary Examiner* — Tarun Sinha
(74) *Attorney, Agent, or Firm* — Fogg & Powers LLC

(57) ABSTRACT

An embodiment of a gyroscope subsystem that is configured to reduce, or to eliminate, the effect of bias includes a gyroscope assembly, a calibration assembly, a determining circuit, and a bias-reducing circuit. The gyroscope assembly is configured to generate a gyroscope signal in response to a calibration angular velocity and another angular velocity about a sense axis, and the calibration assembly is configured to generate, about the sense axis, the calibration angular velocity. The determining circuit is configured to determine the other angular velocity in response to the gyroscope signal, and the bias-reducing circuit is configured to reduce a bias component of the determined other angular velocity in response to the gyroscope signal. For example, such a gyroscope subsystem can yield a value of an angular velocity having a bias component that is significantly less than the bias component of a value yielded by a conventional gyroscope subsystem.

19 Claims, 8 Drawing Sheets

(51) Int. Cl.
  *G01C 19/5649* (2012.01)
  *G01C 19/72* (2006.01)
(58) Field of Classification Search
  USPC .................................. 73/504.12, 1.37, 1.77
  See application file for complete search history.

(56) References Cited

U.S. PATENT DOCUMENTS

2013/0197845 A1   8/2013   Keal et al.
2015/0114082 A1*  4/2015   Blanchard ............ G01C 25/005
                                                      73/1.77
2016/0018243 A1   1/2016   Okon et al.

OTHER PUBLICATIONS

Madgwick Sebastian O.H.; "Automated calibration of an accelerometers, magnetometers and gyroscopes—A feasibility study" "Technical Report for x-io Technologies Limited." Dated: Sep. 20, 2010; pp. 1-11.

Esfandyari et al, "Introduction to MEMS gyroscopes", "Solid State Technology", "http://electroiq.com/blog/2010/11/introduction-to-mems-gyroscopes/", Nov. 15, 2010, pp. 1-8. Publisher Electroiq.com.

Trusov, "Overview of MEMS Gyroscopes: History, Principles of Operations, Types of Measurements", Retrieved from alexandertrusov.com/uploads/pdf/2011-UCI-trusov-whitepaper-gyros on Nov. 28, 2017, May 10, 2011, p. 1-15, University of California, Irvine, Published in: US.

Zurich Instruments et al, "Operation of MEMS Coriolis Vibratory Gyroscopes", https://www.azom.com/article.aspx?ArticleID=13265, Oct. 27, 2016, AZO Materials.

UK Intellectual Property Office, "Office Action from GB Application No. 1718147.0", from Foreign Counterpart to U.S. Appl. No. 15/792,183, dated Nov. 26, 2019, pp. 1-2, Published: GB.

Intellectual Property Office, "Intention to Grant from GB Application No. 1718147.0", from Foreign Counterpart to U.S. Appl. No. 15/792,183, May 20, 2020, pp. 1 through 2, Published: UK.

* cited by examiner

REDUCING A GYROSCOPE-BIAS COMPONENT IN A DETERMINED VALUE OF ANGULAR VELOCITY WITH SIMULTANEOUS SENSOR OPERATION

SUMMARY

One or more techniques, systems, and subsystems, including circuitry and mechanical elements and assemblies, are described for reducing or eliminating a bias component in a determined value of angular velocity, the bias component being generated by a gyroscope such as a microelectromechanical (MEMS) Coriolis vibratory gyroscope (CVG), according to an embodiment.

FIG. 1 is an isometric view of a single-axis MEMS CVG 10, in response to which computing or other circuitry, or another device (not shown in FIG. 1, hereinafter "computing circuitry"), can determine an angular velocity $\vec{\Omega}(t)$ of a vehicle or other system (e.g., a missile) about an axis 12 of rotation (the z axis in this example), where $\vec{\Omega}(t)$ is a vector having a direction that is aligned with the axis of rotation. $\vec{\Omega}(t)$ follows the right-hand-rule convention. That is, $\vec{\Omega}(t)$ points downward (i.e., is negative) while the rotation that gives rise to $\vec{\Omega}(t)$ is in the clockwise direction, and points upward (i.e., is positive) while the rotation is in the counterclockwise direction. A system can include additional MEMS CVGs. For example, a system can include three such single-axis MEMS CVGs, one for each of the x, y, and z axes of the system.

From the determined angular velocity $\vec{\Omega}(t)$, the computing circuitry (not shown in FIG. 1) can determine, e.g., the angular acceleration, the angular position, and a change in angular position, of the system about the axis 12 of rotation. For example, if the system rotates about the axis 12 from a desired angular position, the computing circuitry can, in response to the angular velocity $\vec{\Omega}(t)$, determine the change in the system's angular position using the MEMS CVG 10, and, therefore, can correct the system's angular position by causing the system to rotate about the axis in a reverse direction back to the desired position. Or, if the system is controlled to rotate about the axis 12 from a starting position to a new position, then the computing circuitry, in response to the angular velocity $\vec{\Omega}(t)$, can determine when the system is in the new position and can cause the system to stop rotating and remain in the new position.

Still referring to FIG. 1, the MEMS CVG 10 is configured to generate a signal from which the angular velocity $\vec{\Omega}(t)$ can be derived by making use of the Coriolis acceleration.

The MEMS CVG 10 includes two or more masses M (sometimes called "proof masses") which are disposed approximately equidistant from, and approximately parallel to, the axis 12 of rotation, and which each have approximately the same mass m. For purposes of example, it is assumed hereinafter that the MEMS CVG 10 includes only two masses $M_1$ and $M_2$.

A velocity-drive assembly (not shown in FIG. 1) is configured to drive each mass $M_1$ and $M_2$ with respective velocities of approximately equal magnitude and approximately opposite phase (e.g., magnitude and phase that are within ±1% of one another). For example, the velocity-drive assembly is configured to drive the mass $M_1$=m back and forth along the x axis in the x-z (y=0) plane at a sinusoidal velocity $\vec{V}(t)$, and is configured to drive the mass $M_2$=back and forth in the x axis in the x-z (y=0) plane at a sinusoidal velocity $-\vec{V}(t)$, which, ideally, has the same amplitude as $\vec{V}(t)$ but is 180° out of phase with $\vec{V}(t)$. That is, ideally, $M_1$ and $M_2$ move toward one another during first half cycles of $\vec{V}(t)$ and $-\vec{V}(t)$, and move away from each other during second half cycles $\vec{V}(t)$ and $-\vec{V}(t)$. The velocity-drive assembly can include, for example, an electrostatic or an inductive/magnetic driver circuit, and can include a mechanical assembly such as a network of springs that is attached to the masses $M_1$ and $M_2$. The combination of the masses $M_1$ and $M_2$ and the mechanical assembly can form a second order system having a resonant frequency such that in operation, the velocity-drive assembly causes the masses $M_1$ and $M_2$ to resonate back and forth at the respective velocities $\vec{V}(t)$ and $-\vec{V}(t)$. The MEMS CVG 10 can also include one or more sensors (e.g., capacitive sensors, magnetic/inductive sensors) that generate respective signals from which the velocities $\vec{V}(t)$ and $-\vec{V}(t)$ of the masses $M_1$ and $M_2$ can be determined.

In response to a force that causes the MEMS CVG 10 to rotate about the z axis 12 of rotation, the MEMS CVG experiences an angular velocity $\vec{\Omega}(t)$ about the axis, where $\vec{\Omega}(t)$ can have an arbitrary phase, arbitrary frequency, and arbitrary magnitude relative to $\vec{V}(t)$ and $-\vec{V}(t)$.

In response to the experienced angular velocity $\vec{\Omega}(t)$, the masses $M_1$ and $M_2$ experience respective Coriolis accelerations $\vec{a}_c(t)$ and $-\vec{a}_c(t)$ in they dimension according to the following equations:

$$\vec{a}_c(t) = 2(\vec{V}(t) X \vec{\Omega}(t)) \quad (1)$$

$$-\vec{a}_c(t) = 2(-\vec{V}(t) X \vec{\Omega}(t)) \quad (2)$$

where "X" is the vector cross-product operator. The MEMS CVG 10 can include respective deflection sensors (e.g., capacitance deflection sensors, magnetic/inductive deflection sensors) to measure the respective y-dimension deflections of the masses $M_1$ and $M_2$, where the second derivatives of the deflections are respectively proportional to the Coriolis accelerations $\vec{a}_c(t)$ and $-\vec{a}_c(t)$. After determining $\vec{a}_c(t)$ and $-\vec{a}_c(t)$, and because $\vec{V}(t)$ and $-\vec{V}(t)$ can be measured, and are, therefore, known, computing circuitry (not shown in FIG. 1) that is part of, or that is coupled to, the MEMS CVG 10 can solve for $\vec{\Omega}(t)$ from equation (1), equation (2), or both equations (1) and (2). For example, the computing circuitry can average the values of $\vec{\Omega}(t)$ obtained from equations (1) and (2) to increase the signal-to-noise ratio (SNR) of the resulting value of $\vec{\Omega}(t)$.

For example, if $\vec{\Omega}(t)$ is constant and $\vec{V}(t)$ and $-\vec{V}(t)$ are sinusoids of equal magnitude and opposite phase, then the deflection sensors effectively sense and generate, at a phase $P_v$ and a frequency $F_v$ of $\vec{V}(t)$ and $-\vec{V}(t)$, two carrier waves that are respectively amplitude modulated by the y-dimension deflection magnitudes of the masses $M_1$ and $M_2$. For example, if $\vec{V}(t)$ has a frequency of $F_v$=10 KHz, then the signal generated by the deflection sensor for $M_2$ is a sinusoid having a frequency $F_v$ of 10 KHz and an amplitude that is proportional to the deflection magnitude of $M_2$, and, therefore, that is proportional to the magnitudes of $\vec{a}_c(t)$ and $\vec{\Omega}(t)$.

For the measurement of $\vec{\Omega}(t)$ in response to the y-dimension deflections of the masses $M_1$ and/or $M_2$ to be accurate, $M_1$ and/or $M_2$ ideally exhibit zero deflection in they dimension when $\vec{\Omega}(t)=0$ regardless of its/their respective positions in the x dimension. Furthermore, $M_1$ and $M_2$ are moved in opposite directions, with equal-but-opposite velocities, because if there is motion in they dimension (common-mode motion), which is typically a result of vibration and mechanical shock experienced by the system that includes the MEMS CVG 10, the y-dimension sensor(s) will reject this motion since the readout is implemented differentially (i.e., only movement when one mass M moves differently than the other mass M in they dimension is interpreted as a Coriolis acceleration). If both masses $M_1$ and $M_2$ are used to determine $\vec{\Omega}(t)$ and the masses $M_1$ and $M_2$ have different masses/weights, then this would create differential deflection (one mass would deflect in they dimension by a first distance, the other mass would deflect in the y dimension but by a second distance such that there would be a relative difference in deflection between $M_1$ and $M_2$), and this relative difference would give rise to an error in $\vec{\Omega}(t)$. Although the error in $\vec{\Omega}(t)$ due to the different masses of $M_1$ and $M_2$ can be corrected using conventional techniques, these techniques are not described herein. Hereinafter, it is assumed, for purposes of example, that $M_1$ and $M_2$ have the same mass m.

Unfortunately, one or both of the masses $M_1$ and $M_2$ may exhibit non-zero deflection in they dimension when $\vec{\Omega}(t)=0$, where this non-zero deflection is referred to as deflection bias, or, more simply, bias. This deflection bias, which typically is a function of the x-dimension positions of the respective masses $M_1$ and $M_2$, adds to (or subtracts from) the deflection caused by the Coriolis accelerations $\vec{a}_c(t)$ and $-\vec{a}_c(t)$, and, therefore, introduces error into the measured/determined value of $\vec{\Omega}(t)$, and into the calculation of all other quantities (e.g., angular acceleration, angular position, change in angular position) derived from the determined value of $\vec{\Omega}(t)$.

Although one or more techniques exist for calibrating the MEMS CVG 10 to reduce such bias error, these one or more techniques are, unfortunately, unsuitable for some applications. For example, at least one of these techniques requires the MEMS CVG 10 to be offline during the calibration procedure, which can last, for example, from 0.5-30 seconds. Consequently, the deflection sensors cannot be used to measure the desired quantities $\vec{a}_c(t)$ and $-\vec{a}_c(t)$ accurately.

An embodiment of a gyroscope subsystem that reduces, or eliminates, the effect of bias includes a gyroscope assembly, a calibration assembly, a determining circuit, and a bias-reducing circuit. The gyroscope assembly is configured to generate a gyroscope signal in response to a calibration angular velocity and another angular velocity about a sense axis, and the calibration assembly is configured to generate, about the sense axis, the calibration angular velocity. The determining circuit is configured to determine the other angular velocity in response to the gyroscope signal, and the bias-reducing circuit is configured to reduce a bias component of the determined other angular velocity in response to the gyroscope signal.

For example, such a gyroscope subsystem can yield a value of an angular velocity $\vec{\Omega}(t)$ having a bias component (i.e., a component due to deflection bias of the gyroscope mass(es)) that is significantly less than the bias component of a value of $\vec{\Omega}(t)$ yielded by a conventional gyroscope subsystem.

DETAILED DESCRIPTION

Unless otherwise noted, each non-zero value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. And, unless otherwise noted, for a zero-value, the encompassed range is ±1 of the same units unless otherwise stated.

Figure 1:
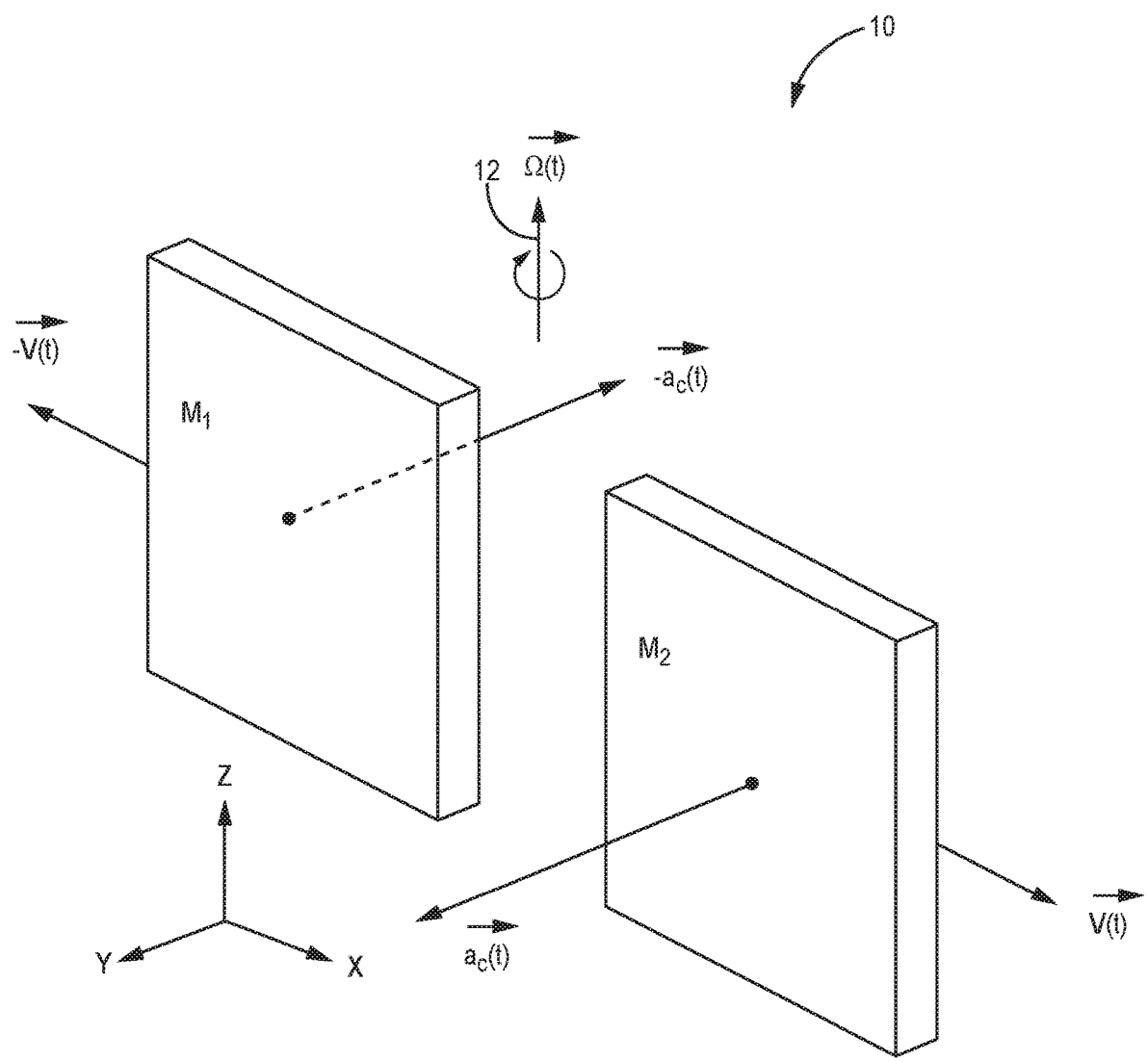
FIG. 1 is an isometric view of an MEMS CVG, according to an illustrative example.
Figure 2:
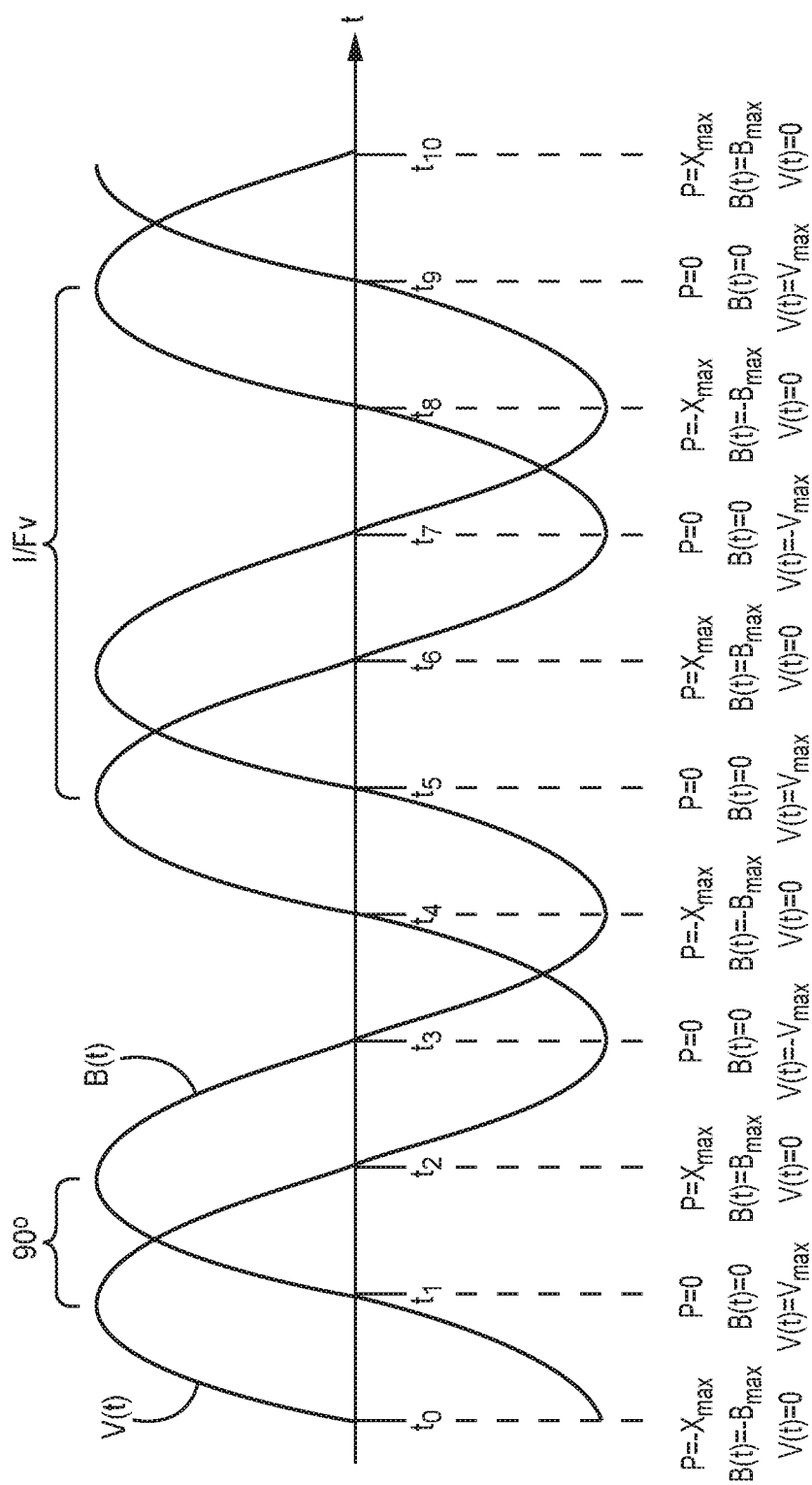
FIG. 2 is a plot of the magnitudes of a mass-drive velocity $\vec{V}(t)$, and of a deflection bias $\vec{B}(t)$, versus time for the MEMS CVG of FIG. 1, according to an illustrative example.

Referring to FIGS. 1 and 2, a technique for reducing or eliminating a deflection-bias component from the determined angular velocity $\vec{\Omega}(t)$ is described, according to an embodiment. Such a technique takes advantage of the phase relationships between the velocities $\vec{V}(t)$ and $-\vec{V}(t)$ and deflection biases $\vec{B}(t)$ and $-\vec{B}(t)$ of the masses $M_1$ and $M_2$, respectively. For clarity, only the velocity $\vec{V}(t)$ and deflection bias $\vec{B}(t)$ of the mass $M_2$ is discussed, it being understood that a similar discussion applies to the mass $M_1$. Furthermore, for purposes of explanation, the following example assumes that the velocity $\vec{V}(t)$ is sinusoidal, and that the deflection bias $\vec{B}(t)$ is also sinusoidal and depends on the position of the mass $M_2$ in the x dimension, where the position of $M_2$ is the position of the center of $M_2$. That is, it is assumed that as $M_2$ moves to the right in FIG. 1, the magnitude of $\vec{B}(t)$ increases, and as $M_2$ moves to the left, the magnitude of $\vec{B}(t)$ decreases. It is also assumed that the mass-spring assembly including $M_2$ and the flexible/spring-like members (not shown in FIGS. 1-2) that hold $M_2$ in place is driven by a signal that causes the velocity $\vec{V}(t)$ to have a frequency that is at, or near (e.g., within ±10%), the resonant frequency of the mass-spring assembly. With the above assumptions, the shape of $\vec{B}(t)$ is sinusoidal because it is derived from the sinusoidal motion of the deflection; therefore, both the velocity $\vec{V}(t)$ and the deflection bias $\vec{B}(t)$ have the same shape as a function of time. The shape of the deflection-bias signal, as read by a sensor assembly (not shown in FIGS. 1-2), may be different from the shape of $\vec{B}(t)$ (for example, rectangular (or very close to rectangular)) due to the gain of a signal amplifier (not shown in FIGS. 1-2) being too high, and thus causing the amplifier to introduce distortion into the output signal by causing the output signal to "hit the power-supply rails" +V and −V of the amplifier. Although the angular velocity $\vec{\Omega}(t)$ still could be derived from such a "rail-to-rail" output signal using a demodulation approach where only the phase is tracked, the linearity of the amplifier could be compromised. Therefore, for purposes of example, it is assumed that no such rail-to-rail distortion occurs in the signals from which $\vec{\Omega}(t)$ is determined, and that the demodulation is assumed to be ideal.

Still referring to FIGS. 1-2, at an initial time $t_0$, the position P(t) of the center of the mass $M_2$ is $-X_{max}$, $\vec{B}(t)=-B_{max}$, and $\vec{V}(t)=0$, where $-X_{max}$ is the most negative position that the center of $M_2$ reaches during a period of $\vec{V}(t)$, and $-B_{max}$ is the most negative y-dimension deflection that the center of the mass $M_2$ reaches during a period of $\vec{B}(t)$.

After $t_0$, the mass $M_2$ begins to move to the right toward its resting displacement P(t)=0. That is, when no velocity drive is applied to the mass $M_2$ and $\vec{\Omega}(t)=0$, the center of the mass $M_2$ is at a position x=0.

At a time $t_1$, the position P(t) of the center of the mass $M_2$ is x=0, $\vec{B}(t)=0$, and $\vec{V}(t)=V_{max}$, which is the maximum velocity that the mass $M_2$ reaches during a period of $\vec{V}(t)$.

At a time $t_2$, $P(t)=X_{max}$, $\vec{B}(t)=B_{max}$, and $\vec{V}(t)=0$, where $X_{max}$ is the most positive position that the center of the mass $M_2$ reaches during a period of $\vec{V}(t)$, and $B_{max}$ is the most positive y-dimension bias deflection that the center of the mass $M_2$ reaches during a period of $\vec{B}(t)$.

After $t_2$, the mass $M_2$ begins to move to the left, from its maximum position $P(t)=X_{max}$ and maximum bias deflection $\vec{B}(t)=B_{max}$ back toward P(t)=0 and $\vec{B}(t)=0$.

At a time $t_3$, P(t)=0, $\vec{B}(t)=0$, and $\vec{V}(t)=-V_{max}$, the minimum velocity that the mass $M_2$ reaches during a period of $\vec{V}(t)$ (the direction of $\vec{V}(t)$ at the time $t_3$ is opposite to the direction of $\vec{V}(t)$ at the time $t_1$, but the magnitude $|\vec{V}(t)|$ of $\vec{V}(t)$ at the time $t_3$ is the same as the magnitude $|\vec{V}(t)|$ at the time $t_1$).

At a time $t_4$, $P(t)=-X_{max}$, $\vec{B}(t)=-B_{max}$, and $\vec{V}(t)=0$.

After the time $t_4$, the above-described cycles of $\vec{V}(t)$ and $\vec{B}(t)$ repeat.

Referring to FIG. 2, the velocity $\vec{V}(t)$ and the deflection bias $\vec{B}(t)$ have the same fundamental frequency $F_v$, but the phase of $\vec{B}(t)$ lags the phase of $\vec{V}(t)$ by 90° ($\pi/2$ radians). That is, $\vec{B}(t)$ is orthogonal to $\vec{V}(t)$, and $\vec{V}(t)$ is orthogonal to $\vec{B}(t)$. And because $\vec{a}_c(t)$ is in phase with $\vec{V}(t)$, $\vec{B}(t)$ is also orthogonal to $\vec{a}_c(t)$. And as long as $\vec{V}(t)$ is sinusoidal and $\vec{B}(t)$ is any function of the position (typically sinusoidal) of the mass $M_2$ in the x dimension (these conditions typically exist at least in a CVG such as the MEMS CVG 10 of FIG. 1), it can be shown mathematically that the orthogonality between $\vec{B}(t)$ and $\vec{V}(t)$, and, therefore, the orthogonality between $\vec{B}(t)$ and $\vec{a}_c(t)$, holds regardless of the value of the rotational velocity $\vec{\Omega}(t)$ about the rotational axis 12.

Therefore, if the gyroscope subsystem including the MEMS CVG 10 demodulates the gyroscope signal generated by the y-dimension deflection sensor (not shown in FIGS. 1-2) with a signal having the same frequency $F_v$ and the same phase $P_v$ as $\vec{V}(t)$ to obtain a base-band signal from which the gyroscope subsystem can calculate $\vec{a}_c(t)$, the component of $\vec{B}(t)$ in this baseband signal, and thus the component of $\vec{B}(t)$ in $\vec{a}_c(t)$ and $\vec{\Omega}(t)$, is, ideally, zero. That is, because $\vec{B}(t)$ is orthogonal to $\vec{a}_c(t)$, and because the signal from which $\vec{a}_c(t)$ is derived is obtained by demodulating the y-dimension deflection (gyroscope) signal with a demodulation signal that is, ideally, equal in phase and frequency to the phase $P_v$ and frequency $F_v$ of $\vec{V}(t)$, which is also orthogonal to $\vec{B}(t)$, the component of $\vec{B}(t)$ in the demodulated y-dimension deflection (gyroscope) signal, and, therefore, the component of $\vec{B}(t)$ in $\vec{a}_c(t)$ and $\vec{\Omega}(t)$ is, at least theoretically, zero.

But unfortunately, even if the mass $M_2$ is driven to have a sinusoidal velocity $\vec{V}(t)$, the phase of the signal generated by a mass-velocity sensor assembly may not be constant over time. There are various reasons for this. One reason may be that the Coriolis force acts in the sense dimension (the y dimension in the above example), and the y-dimension deflection of the mass $M_2$ caused by the Coriolis force depends on the parameters of the mass-driving assembly (e.g., springs) resonator, which, as described above, is typically characterized as a second-order system. Such a second-order system has an amplitude and phase response. When there is a relative difference between the resonant frequency at which the mass $M_2$ moves and the sense frequency (e.g., the sensed frequency changes by 10% but the resonant frequency at which the mass $M_2$ oscillates changes by only by 5%), the phase of the sense signal changes with respect to the phase of the actual velocity $\vec{V}(t)$ at which the mass $M_2$ is moving (the amplitude spectrum also changes, but this is not as critical as phase since the change of phase can cause cross coupling from the deflection bias, which is typically about one hundred times larger than the deflection caused by the Coriolis acceleration). Both y-dimension deflections—the deflection caused by the Coriolis acceleration (caused by the angular velocity) and the deflection caused by other forces (e.g., deflection bias) are phase shifted by some degrees. Other reasons for phase change may be the circuitry, e.g., the phase delays (time delays) differ for the mass $M_2$ drive loop or sense loop (velocity sensor) and the y-dimension deflection sensor.

Without external stimulus, the phase cannot be determined and the MEMS gyroscope needs to be recalibrated to adjust the demodulator so that there is zero signal in the y-dimension deflection sensor channel if there is no angular velocity $\vec{\Omega}(t)$ about the axis 12. And sometimes even the frequency $F_v$ of $\vec{V}(t)$, which is the actual velocity of the mass $M_2$, is not constant over time. As discussed above, reasons for this phase and frequency difference include phase shifts that may be imparted by circuitry (e.g., a phase-locked loop (PLL)) used to generate the sinusoidal mass-drive signal, and phase shifts that may be imparted by the $M_2$ mass-spring assembly.

One way to obtain the phase $P_v$ of $\vec{V}(t)$ is to measure $\vec{V}(t)$ while $\vec{\Omega}(t)=0$, for example, during an initial calibration of the MEMS gyroscope 10 before the MEMS gyroscope is installed in a system, and to set the phase of the demodulation signal equal to the obtained phase $P_v$. But the phase $P_v$ of $\vec{V}(t)$ may change relative to the phase of the demodulation signal over time, due to, e.g., the age of the MEMS gyroscope, changes in the spring constants and/or resonant frequency of the $M_2$ mass-spring assembly, and temperature. And once the MEMS gyroscope is installed in a system, a re-calibration period during which $\vec{\Omega}(t)=0$ may not be obtainable. For example, if the MEMS gyroscope is installed in a spacecraft, it may be impracticable or impossible to prevent the vehicle from rotating about the axis of rotation 12 (FIG. 1) for a period of time long enough to recalibrate the MEMS gyroscope while $\vec{\Omega}(t)=0$.

As described below in conjunction with FIGS. 3-9, an embodiment of a calibration technique for reducing deflection bias in, or eliminating deflection bias from, a calculated value of $\vec{\Omega}(t)$ takes advantage of the deflection bias $\vec{B}(t)$ being orthogonal to the Coriolis acceleration $\vec{a}_c(t)$.

The technique includes (1) injecting a calibration angular velocity $\vec{\Omega}_{calibration}(t)$ about the axis 12 of rotation, where $\vec{\Omega}_{calibration}(t)$ has an amplitude that is significantly greater than the amplitude of $\vec{B}(t)$ and has a frequency that is significantly greater than $\vec{\Omega}(t)$, (2) in-phase (I) and quadrature-phase (Q) demodulating the y-dimension deflection signal, (3) filtering $\vec{\Omega}_{calibration}(t)$ from the I-demodulated signal, and (4) adjusting the phase/frequency of the I demodulating signal so as to zero, or at least to minimize, the component of $\vec{\Omega}_{calibration}(t)$ in the Q-demodulated signal. Ideally, if the component of $\vec{\Omega}_{calibration}(t)$ in the Q-demodulated signal is zero, then it follows that the component of the deflection bias of $\vec{B}(t)$ in the I-demodulated signal is zero. And because $\vec{\Omega}(t)$ is derived from the I-demodulated signal, the component of the deflection bias $\vec{B}(t)$ in $\vec{\Omega}(t)$ is also ideally zero.

Figure 3:
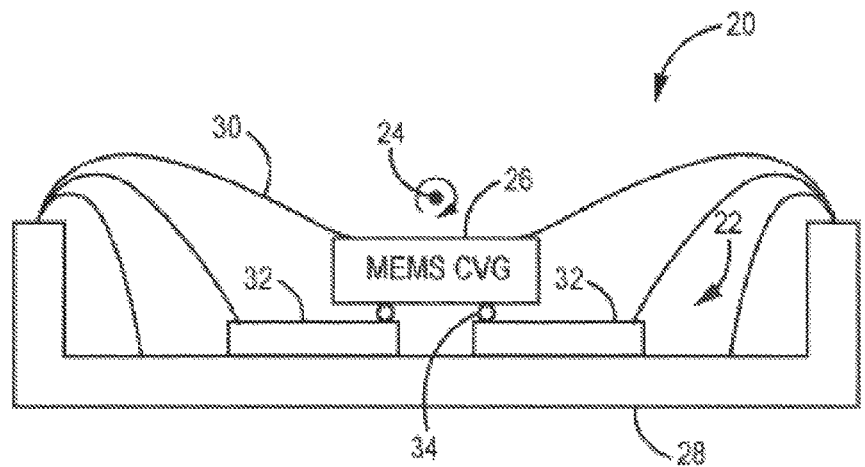
FIG. 3 is a cutaway side view of a gyroscope subsystem that includes an MEMS CVG, a calibration assembly, and a bias-reducing circuit, according to an embodiment.

FIG. 3 is a cutaway side view of a gyroscope subsystem 20, which includes a calibration assembly 22 configured to inject a calibration angular velocity $\vec{\Omega}_{calibration}(t)$ about an axis 24 of rotation, according to an embodiment.

In addition to the calibration assembly 22, the gyroscope subsystem 20 includes a MEMS CVG assembly 26, a subsystem package 28, and bonding wires 30 to electrically couple the calibration assembly 22 and the MEMS CVG assembly 26 to conductive pins (not shown in FIG. 3) external to the subsystem package.

The calibration assembly 22 includes a two or more vibrators 32, which are mounted to the subsystem package 28, and to which is mounted, via, e.g., epoxy 34, the MEMS CVG assembly 26. For example, the vibrators 32 are piezoelectric vibrators. Respective bonding wires 30 couple the vibrators 32 to a driver circuit (not shown in FIG. 3), which is controlled by a control circuit (not shown in FIG. 3) such as a microprocessor or microcontroller. One or both of the driver circuit and the control circuit can be disposed external to, or inside of, the subsystem package 28.

The MEMS CVG assembly 26 includes a MEMS CVG (not shown in FIG. 3), which may be similar to the MEMS CVG 10 of FIG. 1, drive circuitry (not shown in FIG. 3) for driving the proof masses (not shown in FIG. 3) at respective velocities, a sensor assembly (not shown in FIG. 3) for generating a signal that represents the velocity of the proof masses, and a second sensor assembly (not shown in FIG. 3) for generating a signal that represents a deflection of proof masses in a dimension perpendicular to the direction of the velocity of the proof masses. The MEMS CVG assembly 26 also includes a determining circuit (not shown in FIG. 3) configured to determine the angular velocity $\vec{\Omega}(t)$ to which the gyroscope subsystem 20 is subjected about the axis of rotation 24, and includes a bias-reducing circuit configured to reduce or eliminate a component of the deflection bias $\vec{B}(t)$ in the determined angular velocity $\vec{\Omega}(t)$. The determining circuit and the bias-reducing circuit can be implemented on one or more computing circuits, such as the computing circuit that is configured to control the vibrator-driver circuit as described above. Alternately, the mass-drive circuitry, sensor assembly, the angular-velocity determiner circuit, and the bias-reducing circuit, can be disposed outside of the MEMS CVG package but inside of the subsystem package 28, or can be disposed outside of both the MEMS CVG package and the subsystem package.

And the subsystem package 28 (and the MEMS CVG package) can be formed from any suitable material such as an epoxy resin.

Still referring to FIG. 3, the operation of the calibration assembly 22 is described, according to an embodiment.

The calibration-assembly controller (not shown in FIG. 3) controls the calibrator drive circuit (not shown in FIG. 3) to energize the vibrators 32 approximately 180° out of phase with one another such that the vibrators "rock" the MEMS CVG assembly 26 back and forth about the axis 24 to generate an angular calibration velocity $\vec{\Omega}_{calibration}(t)$ about the axis. That is, while one of the vibrators 32 causes a corresponding side of the MEMS CVG assembly 26 to move upward, the other of the vibrators 32 causes an opposite side of the MEMS CVG assembly to move downward. The control circuit causes the drive circuit to continue to energize the vibrators 32 in this rocking manner for a calibration period, which can have a duration in the approximate range of a few milliseconds to thirty seconds, for example, approximately ten seconds. As described above further below, by generating $\vec{\Omega}_{calibration}(t)$ having a frequency that is significantly greater than the expected maximum frequency of the angular velocity $\vec{\Omega}(t)$ caused by one or more non-calibration forces, the calibration assembly 22 can calibrate the MEMS CVG assembly 26 to reduce or eliminate a component of deflection bias in the calculated angular velocity $\vec{\Omega}(t)$ even while the MEMS CVG assembly is operating to measure $\vec{\Omega}(t)$. That is, the MEMS CVG assembly 26 need not be taken "off line" for such bias calibration.

Still referring to FIG. 3, alternate embodiments of the gyroscope subsystem 20 are contemplated. For example, any components described as being inside or otherwise part of the MEMS CVG assembly 26 can be disposed outside of the MEMS CVG assembly, such as inside or outside of the subsystem package 28. Furthermore, any components described as being disposed inside of the gyroscope subsystem 20 can be disposed inside of the MEMS CVG assembly 26 or outside of the subsystem package 28.

Figure 4:
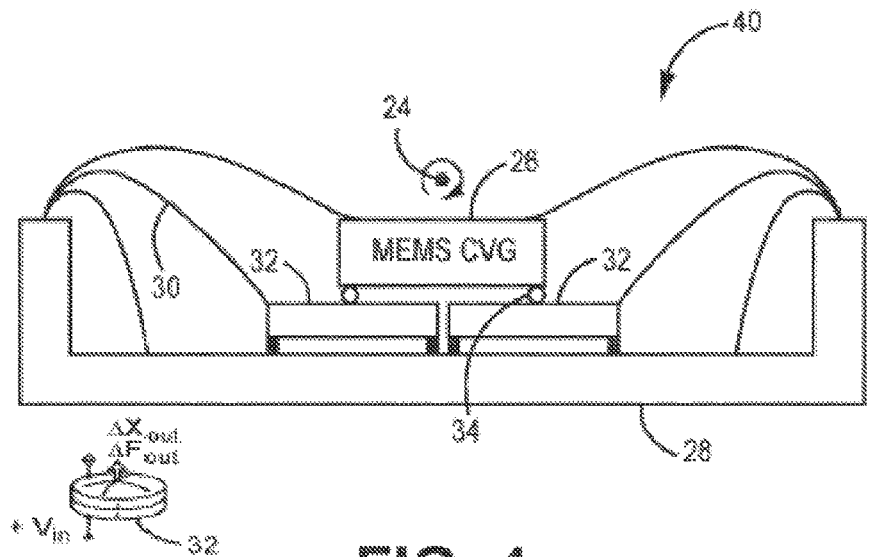
FIG. 4 is a cutaway side view of a gyroscope subsystem that includes an MEMS CVG, a calibration assembly, and a bias-reducing circuit, according to another embodiment.

FIG. 4 is a cutaway side view of an embodiment of a gyroscope subsystem 40, which is similar to the gyroscope subsystem 20 of FIG. 3 except that each of the vibrators 32 (also shown in an isometric view) is a respective piezoelectric bending disk having a maximum displacement at the center of the disk, and that the ends of the MEMS CVG assembly 26 are respectively mounted to the approximate centers of the piezoelectric bending disks. Furthermore, one or more alternate embodiments described above for the gyroscope subsystem 20 of FIG. 3 can be applicable to the gyroscope subsystem 40 of FIG. 4.

Figure 5:
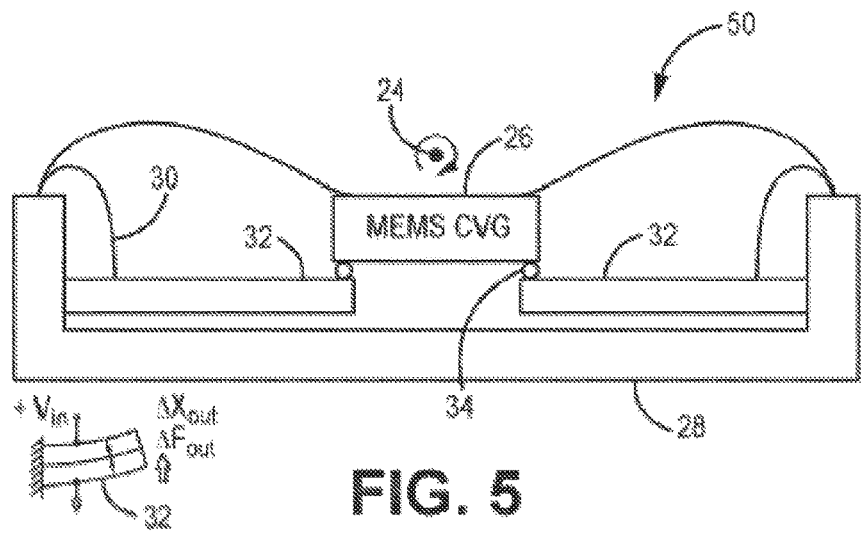
FIG. 5 is a cutaway side view of a gyroscope subsystem that includes an MEMS CVG, a calibration assembly, and a bias-reducing circuit, according to yet another embodiment.

FIG. 5 is a cutaway side view of an embodiment of a gyroscope subsystem 50, which is similar to the gyroscope subsystem 20 of FIG. 3 except that each of the vibrators 32 (also shown in an isometric view) is a respective piezoelectric bending actuator having a maximum displacement at the free end of the actuator, and that the ends of the MEMS CVG assembly 26 are respectively mounted to the free ends of the piezoelectric bending actuators. Furthermore, one or more alternate embodiments described above for the gyroscope subsystem 20 of FIG. 3 can be applicable to the gyroscope subsystem 50 of FIG. 5.

Figure 6:
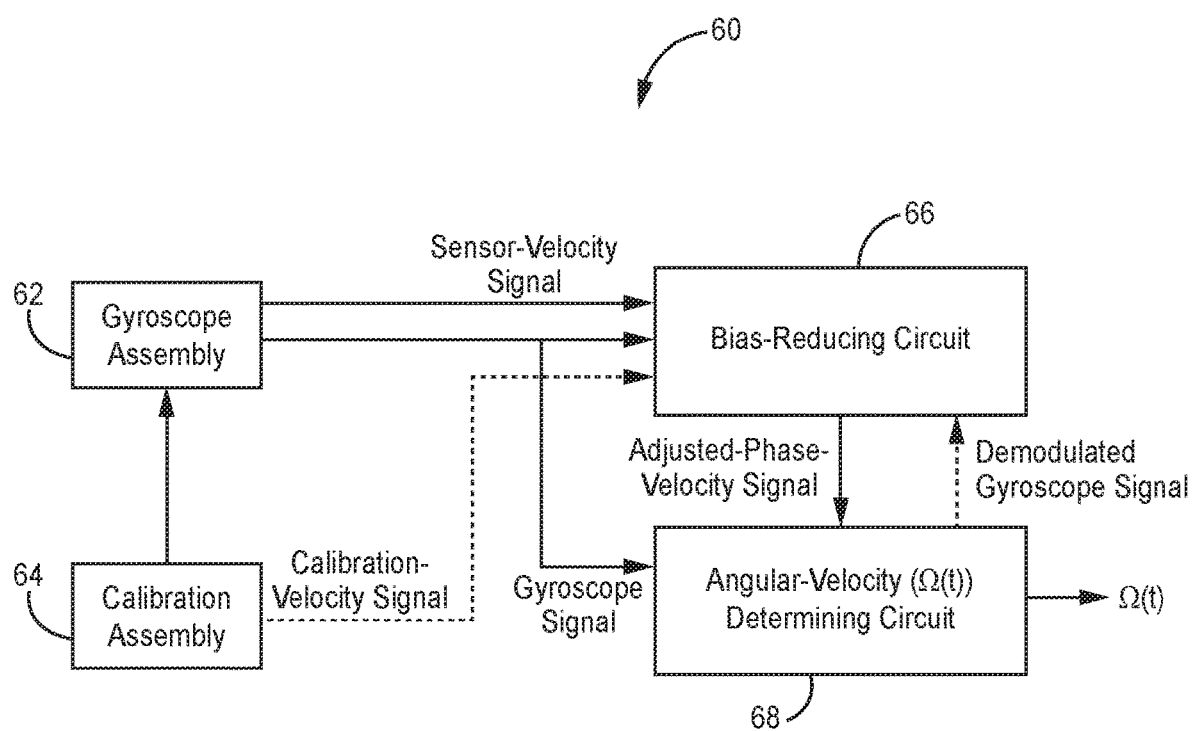
FIG. 6 is a block diagram of the gyroscope subsystems of FIGS. 3-5, according to an embodiment.

FIG. 6 is a block diagram of a gyroscope subsystem 60, according to an embodiment. For example, the gyroscope subsystem 60 can be similar to one or more of the gyroscope subsystems 20, 40, and 50 of FIGS. 3-5, respectively. Furthermore, for purposes of example, it is assumed that the gyroscope subsystem 60 is configured to determine the angular velocity $\vec{\Omega}(t)$ from signals generated by, or otherwise corresponding to, a single proof mass. It is understood, however, that the gyroscope subsystem 60 can be configured to determine the angular velocity $\vec{\Omega}(t)$ from signals generated by, or otherwise corresponding to, multiple proof masses. For example, the gyroscope subsystem 60 can be configured to determine the angular velocity $\vec{\Omega}(t)$ from the sum or average of signals generated by, or otherwise corresponding to, multiple proof masses.

The gyroscope subsystem 60 includes a gyroscope assembly 62, a calibration assembly 64, a bias-reducing circuit 66, and an angular-velocity determining circuit 68. And the gyroscope subsystem 60 can also include a control circuit (not shown in FIG. 6), such as a microprocessor, microcontroller, or field-programmable gate array (FPGA) that is configured to control the configuration and operation of one or more of the assemblies 62 and 64 and circuits 66 and 68.

The gyroscope assembly 62 can be a MEMS CVG assembly that is similar to the MEMS CVG 10 of FIG. 1 and the MEMS CVG assembly 26 of FIGS. 3-5. The gyroscope assembly 62 includes drive circuitry (not shown in FIG. 3) configured to drive the two proof masses (not shown in FIG. 3) at respective velocities, a first sensor assembly (not shown in FIG. 3) configured to generate respective sensor-velocity signals that represent the velocities $\vec{V}(t)$ and $-\vec{V}(t)$ of the proof masses, and a second sensor assembly (not shown in FIG. 3) for generating the gyroscope signals that respectively represent the deflections of the proof masses in a dimension (e.g., the y dimension) perpendicular to the dimension of the velocities of the proof masses. For clarity, only the sensor-velocity signal representing $\vec{V}(t)$, and the gyroscope signal corresponding to the proof mass (e.g., $M_2$ of FIG. 1) moving at $\vec{V}(t)$, are described, it being understood that a similar description applies to the sensor-velocity signal representing $-\vec{V}(t)$, and the gyroscope signal corresponding to the proof mass (e.g., $M_1$ of FIG. 1) moving at $-\vec{V}(t)$. Alternatively, a single sensor-velocity signal can represent both $\vec{V}(t)$ and $-\vec{V}(t)$, and a single gyroscope signal can correspond to both of the proof masses (e.g., $M_1$ and $M_2$ of FIG. 1) moving at $\vec{V}(t)$ and $-\vec{V}(t)$, respectively, The calibration assembly 64 can be similar to the calibration assembly 22 of FIGS. 3-5, and includes two or more vibrators (not shown in FIG. 6), a driver circuit (not shown in FIG. 6) configured to drive the vibrators, and, in an alternate embodiment, a sensor assembly (not shown in FIG. 6) configured to generate a calibration-velocity signal that represents the calibration angular velocity $\vec{\Omega}_{calibration}(t)$ that the calibration assembly imparts to the gyroscope assembly.

The bias-reducing circuit 66 is configured to generate, in response to the sensor-velocity signal and the gyroscope signal, an adjusted-phase velocity signal, which is the sensor-velocity signal shifted in phase so that the adjusted-phase velocity signal is in phase with the velocity $\vec{V}(t)$. In an alternate embodiment, the bias-reducing circuit 66 is configured to generate the adjusted-phase velocity signal in response to the sensor-velocity signal, the calibration-velocity signal, and a demodulated gyroscope signal from the determining circuit 68.

The angular-velocity determining circuit 68 is configured to demodulate the gyroscope signal in response to the adjusted-phase velocity signal, and to determine the angular velocity $\vec{\Omega}(t)$ about the axis of rotation in response to the demodulated gyroscope signal. The bias-reducing circuit 66 is configured to adjust the phase of adjusted-phase velocity signal such that the angular velocity $\vec{\Omega}(t)$ determined by the determining circuit 68 has a reduced deflection-bias component as compared to the deflection-bias component that would be in the determined angular velocity $\vec{\Omega}(t)$ if the determining circuit 68 were to demodulate the gyroscope signal directly with the sensor-velocity signal from the gyroscope assembly 62. In an alternate embodiment, the determining circuit 68 is also configured to generate, and to provide to the bias-reducing circuit 66, the demodulated gyroscope signal.

Still referring to FIG. 6, alternate embodiments of the gyroscope subsystem 60 are contemplated. For example, the bias-reducing circuit 66 and the angular-velocity determining circuit 68 can be part of the gyroscope assembly 62 as described above in conjunction with FIGS. 3-5. Furthermore, although not shown, the gyroscope assembly 62, calibration assembly 64, bias-reducing circuit 66, and angular-velocity determining circuit 68 can be disposed in a same package. Moreover, instead of the determining circuit 68 being configured to determine the angular velocity $\vec{\Omega}(t)$ from the gyroscope (deflection) signal from only a single proof mass, the determining circuit can be configured to determine $\vec{\Omega}(t)$ from more than one proof mass of the gyroscope assembly 62. In addition, portions of one or more of the gyroscope assembly 62, calibration assembly 64, bias-reducing circuit 66, and determining circuit 68 can be formed by one or more computing circuits such as one or more microprocessors, microcontrollers, or FPGAs. Furthermore, one or more alternate embodiments described above for the gyroscope subsystem 20 of FIG. 3 can be applicable to the gyroscope subsystem 60 of FIG. 6.

Figure 7:
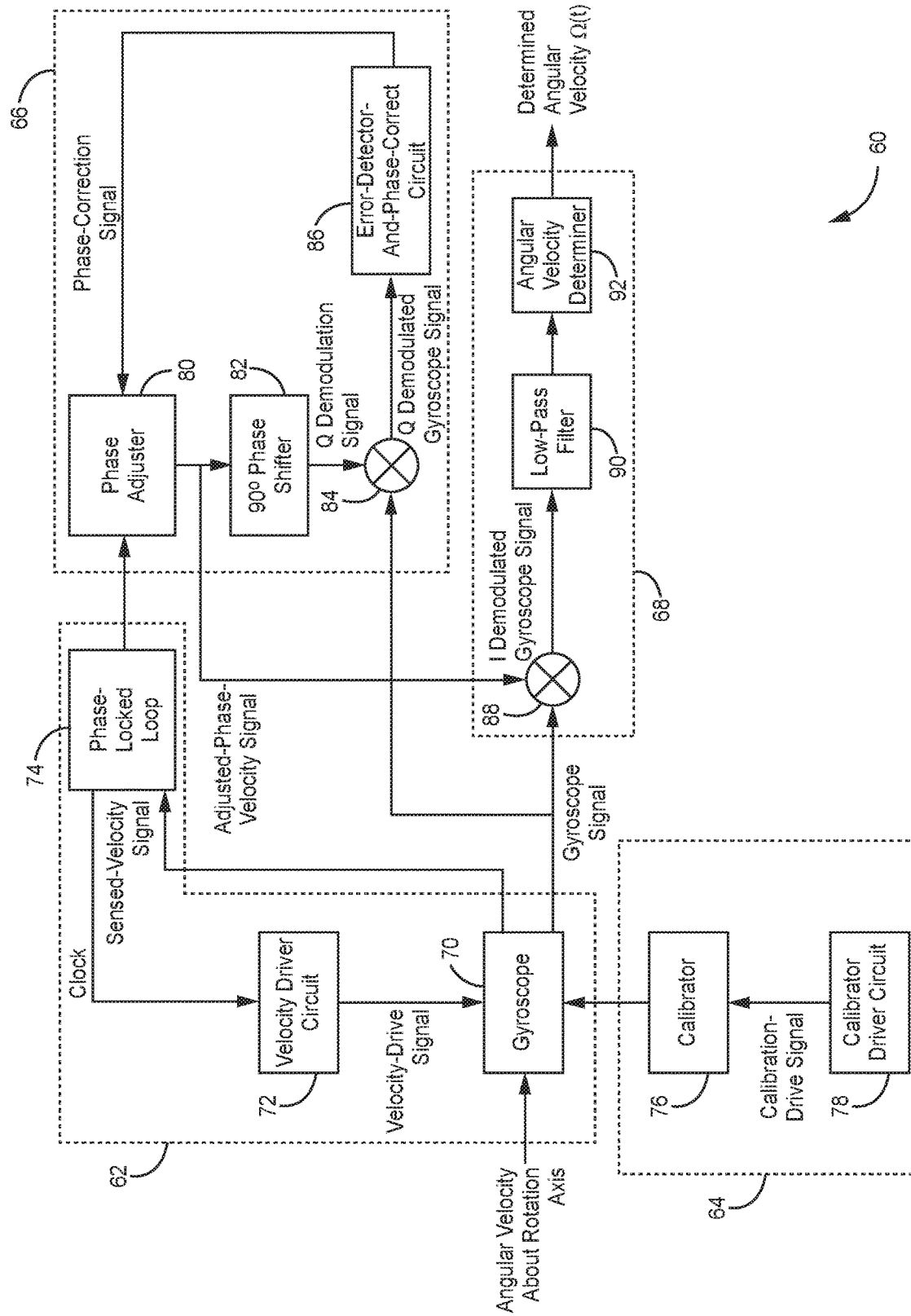
FIG. 7 is a schematic diagram of the gyroscope subsystem of FIG. 6, according to an embodiment.

FIG. 7 is a diagram of the gyroscope subsystem 60 of FIG. 6, according to an embodiment in which the subsystem determines the angular velocity $\vec{\Omega}(t)$ in response to the gyroscope (deflection) signal from a single proof mass of the gyroscope assembly 62.

The gyroscope assembly 62 includes a gyroscope 70, velocity-driver circuit 72, and a phase-locked loop (PLL) 74. The gyroscope 70 can be, for example, a MEMS CVG such as the MEMS CVG 10 of FIG. 1 or the MEMS CVG 20 of FIGS. 3-5, includes a first sensor assembly (not shown in FIG. 7) configured to generate a sensed-velocity signal representative of the velocity of one or more of the proof masses, and includes a second sensor assembly (not shown in FIG. 7) configured to generate a gyroscope signal that represents the deflection of the same one or more proof masses in a direction of Coriolis acceleration. The velocity-driver circuit 72 is configured to generate a velocity-drive signal in response to a clock signal from the PLL 74, and to drive, with the signal, the one or more proof masses of the gyroscope 70 at respective velocities each having, at least ideally, a same magnitude V(t). For example, the gyroscope 70 can include a conventional electrostatic driver or a conventional magnetic/inductive driver that is excited by the velocity-drive signal. The PLL 74 is configured to lock to, and to generate a replica of, the sensed-velocity signal, and to generate the clock signal, which drives the phase and frequency of the velocity signal toward the phase and frequency of the actual velocity (e.g., the resonant velocity) of one or more of the proof masses. Alternatively, the PLL 74 can receive and lock to the velocity-drive signal and not generate the clock signal.

The calibration assembly 64 includes a calibrator 76 and a calibrator-driver circuit 78. The calibrator 76 is configured to impart an angular calibration velocity $\vec{\Omega}_{calibration}(t)$ to the gyroscope 70 about the rotational axis (not shown in FIG. 7) of the gyroscope. For example, the calibrator 76 can include piezoelectric vibrators that "rock" the gyroscope 70 back and forth about its rotational axis. The calibrator-driver circuit 78 is configured to generate a calibration-drive signal, which has a frequency, and which excites the calibrator 76 to impart, to the gyroscope 70, an angular calibration velocity $\vec{\Omega}_{calibration}(t)$ having approximately the same frequency.

The bias-reducing circuit 66 includes a phase-adjuster circuit 80, a quadrature (90°) phase-shifter circuit 82, a signal mixer 84, and an error-detector-and-phase-correct circuit 86. The phase adjuster 80 is configured to adjust the phase of the sensed-velocity signal from the PLL 74 in response to a phase-correction signal to reduce the level of a deflection-bias component in, or eliminate the deflection-bias component from, the determined value of the angular velocity $\vec{\Omega}(t)$. The quadrature phase shifter 82 is configured to shift the phase-adjusted signal from the phase adjuster 80 by 90° to generate a quadrature phase-adjusted signal. The signal mixer 84 is configured to quadrature (Q) demodulate the gyroscope signal from the gyroscope 70 in response to the quadrature phase-adjusted signal from the quadrature phase shifter 82. And the error-detector-and-phase-correct circuit 86 is configured to generate the phase-correction signal in response to the Q demodulated gyroscope signal.

The angular-velocity determining circuit 68 includes a signal mixer 88, a low-pass filter 90, and an angular-velocity determiner 92. The signal mixer 88 is configured to in-phase (I) demodulate the gyroscope signal from the gyroscope 70 in response to the adjusted-phase velocity signal from the bias-reducing circuit 66. The filter 90 is configured to pass the portion of the I-demodulated gyroscope signal carrying the Coriolis acceleration $\vec{a}_c(t)$ due to environmental accelerations applied to the gyroscope 70, and to block the portion of the I-demodulated gyroscope signal carrying the Coriolis acceleration $\vec{a}_{calibrate}(t)$ due to the angular calibration velocity $\vec{\Omega}_{calibrate}(t)$ that the calibrator 76 applies to the gyroscope. And the angular-velocity determiner 92 is configured to determine the angular velocity $\vec{\Omega}(t)$ due to the Coriolis acceleration $\vec{a}_c(t)$ in the filtered signal from the low-pass filter 90. For example, the determiner 92 can be configured to determine $\vec{\Omega}(t)$ according to equation (1) above (the determiner can be configured to obtain $\vec{V}(t)$ in equation (1) from the adjusted-phase velocity signal from the bias-reducing circuit 66). As stated above and as described below, the bias-reducing circuit 66 is configured to generate the adjusted-phase velocity signal having a phase (and frequency) that reduces the level of the deflection-bias component in the determined value of $\vec{\Omega}(t)$ as compared to the level of the deflection-bias component that would be present if the determining circuit 68 were to determine $\vec{\Omega}(t)$ by demodulating the gyroscope signal directly with the sensed-velocity signal with no phase adjustment.

Still referring to FIG. 7, operation of the gyroscope subsystem 60 during a calibration period is described, according to an embodiment. For purposes of example, it is assumed that the calibrator 76 imparts, about the rotation axis (not shown in FIG. 7) of the gyroscope 70, an angular calibration velocity $\vec{\Omega}_{calibrate}(t)$ having a frequency of 500 Hz, and that the gyroscope simultaneously experiences, about the rotation axis, another angular acceleration $\vec{\Omega}(t)$ (e.g., due to environmental forces such as wind) having a frequency of 100 Hz; it is the acceleration $\vec{\Omega}(t)$ that the determining circuit 68 is configured to determine.

The velocity-driver circuit 72 generates the velocity-drive signal to move the one or more proof masses (not shown in FIG. 7) at respective velocities each having a magnitude $\vec{V}(t)$.

Furthermore, the calibrator-drive circuit 78 generates the calibration-drive signal, which causes the calibrator 76 to impart, about the rotation axis of the gyroscope 70, the angular calibration velocity $\vec{\Omega}_{calibrate}(t)$ having a frequency of 500 Hz.

Therefore, the proof masses deflect in respective dimensions (e.g., the y dimension) perpendicular to their velocities in response to the respective Coriolis accelerations that result from $\vec{\Omega}_{calibrate}(t)$ and $\vec{\Omega}(t)$, which exist simultaneously about the rotation axis of the gyroscope 70.

In response to the velocity $\vec{V}(t)$ of one of the proof masses, a first sensor assembly of the gyroscope 70 generates the sensed-velocity signal, which, at least ideally, has a phase $P_v$ and frequency $F_v$ equal to the phase and frequency of the velocity $\vec{V}(t)$ of the one of the proof masses. Alternatively, the sensed-velocity signal can be, or have the same phase and frequency as, the velocity-drive signal.

Furthermore, in response to the Coriolis-induced deflections of the one of the proof masses, a second sensor assembly of the gyroscope 70 generates a gyroscope signal, which, ideally, has the same phase and frequency as the Coriolis acceleration $\vec{a}_c(t)$ that the one of the proof masses experiences.

The PLL 74 locks to, and generates a "cleaner" version of, the sensed-velocity signal, and provides the cleaner velocity signal to the phase adjuster 80.

The phase adjuster 80 shifts the phase of the PLL sensed-velocity signal in response to the phase-correction signal by some arbitrary initial amount (e.g., 0°) to generate the adjusted-phase velocity signal, and the quadrature phase shifter 82 shifts the phase of the adjusted-phase velocity signal by 90° to generate the Q demodulation signal.

The mixer 84 Q demodulates the gyroscope signal in response to the Q demodulation signal, and provides the Q-demodulated gyroscope signal to the error-detector-and-phase-correct circuit 86.

For reasons discussed above in conjunction with FIG. 2, if the Q demodulation signal has the same frequency, and the same phase ±90°, as the velocity $\vec{V}(t)$ of the one of the proof masses in response to which the gyroscope 70 generates the gyroscope signal, then the Q-demodulated gyroscope signal will, at least ideally, include no component of $\vec{\Omega}_{calibrate}(t)$, i.e., will, at least ideally, include no component at the frequency of $\vec{\Omega}_{calibrate}(t)$, which frequency is 500 Hz in this example.

The error-detector-and-phase-correct circuit 86, which is programmed, or otherwise configured, to store, ahead of time, the frequency of $\vec{\Omega}_{calibrate}(t)$, detects, in a conventional manner, whether the Q-demodulated gyroscope signal has a component at the frequency, here 500 Hz, of $\vec{\Omega}_{calibrate}(t)$.

If the error-detection-and-phase-correct circuit 86 detects, in the Q-demodulated gyroscope signal, a component at the frequency of $\vec{\Omega}_{calibrate}(t)$, then the error-detection-and-phase-correction circuit changes a value of the phase-correction signal so as to drive this component toward zero.

Conversely, if the error-detector-and-phase-correct circuit 86 detects no such component in the Q-demodulated gyroscope signal, then the error-detector-and-phase-correct circuit maintains the phase-correction signal at its current value.

Because of noise and other artifacts that may be superimposed on the Q-demodulated gyroscope signal, the component of the Q-demodulated gyroscope signal at the frequency of $\vec{\Omega}_{calibrate}(t)$ may not equal zero even when the Q demodulation signal is orthogonal to the velocity component of the gyroscope signal.

Therefore, the error-detector-and-phase-correct circuit 86 can dither the value of the phase-correction signal to find the value of the phase-correction signal that yields a minimum amplitude of the component of the Q-demodulated gyroscope signal at the frequency of $\vec{\Omega}_{calibrate}(t)$.

Furthermore, the circuit 86 can limit by how much it changes the value of the phase-correction signal at any one time to prevent oscillation of, and to thus stabilize, the feedback loop formed by the circuit 86, phase adjuster 80, quadrature phase shifter 92, and mixer 84.

The error-detector-and-phase-correct circuit 86 continues to implement the above-described procedure to drive the component of the Q-demodulated gyroscope signal at the frequency of $\vec{\Omega}_{calibrate}(t)$ to a minimum value, and to thereafter maintain this component at its minimum value.

The mixer 88 demodulates the gyroscope signal in response to the adjusted-phase velocity signal from the phase adjuster 80 to generate the I-demodulated gyroscope signal.

For reasons discussed above in conjunction with FIG. 2, if the Q demodulation signal has the same frequency, and the same phase ±90°, as the velocity $\vec{V}(t)$ of the one or more of the proof masses in response to which the gyroscope 70 generates the gyroscope signal, then the I-demodulated gyroscope signal will, at least ideally, include no component of $\vec{B}(t)$. If the Q demodulation signal has the same frequency, and the same phase ±90°, as the velocity $\vec{V}(t)$ of the one or more of the proof masses in response to which the gyroscope 70 generates the gyroscope signal, then the adjusted-phase velocity signal (i.e., the I-demodulation signal) has the same frequency, and the same phase, as the velocity $\vec{V}(t)$ of the one or more of the proof masses in response to which the gyroscope 70 generates the gyroscope signal. Therefore, the I-demodulated gyroscope signal will, at least ideally, include the full components of the experienced and calibration angular velocities $\vec{\Omega}(t)$ and $\vec{\Omega}_{calibrate}(t)$, but will include no component of the deflection bias $\vec{B}(t)$ of the one of the proof masses. Consequently, by minimizing the component of $\vec{\Omega}_{calibrate}(t)$ in the Q-demodulated gyroscope signal, the bias-reducing circuit 66 also minimizes the component of $\vec{B}(t)$ in the I-demodulated gyroscope signal.

The low-pass filter 90 filters the component of $\vec{\Omega}_{calibrate}(t)$ from the I-demodulated gyroscope signal, which is possible because the frequency of $\vec{\Omega}_{calibrate}(t)$, here 500 Hz, is significantly different (here larger) than the frequency, here 100 Hz, of the angular velocity $\vec{\Omega}(t)$ experienced by the gyroscope 70 due to, e.g., environmental effects.

And the angular-velocity determiner 92 determines a value for the experienced angular velocity $\vec{\Omega}(t)$ in response to the low-pass-filtered signal, for example, according to one of equations (1) and (2) above.

Still referring to FIG. 7, alternate embodiments of the gyroscope subsystem 60 are contemplated. Furthermore, one or more alternate embodiments described above for the gyroscope subsystems 20 of FIG. 3 and 60 of FIG. 6 can be applicable to the gyroscope subsystem 60 of FIG. 7.

Figure 8:
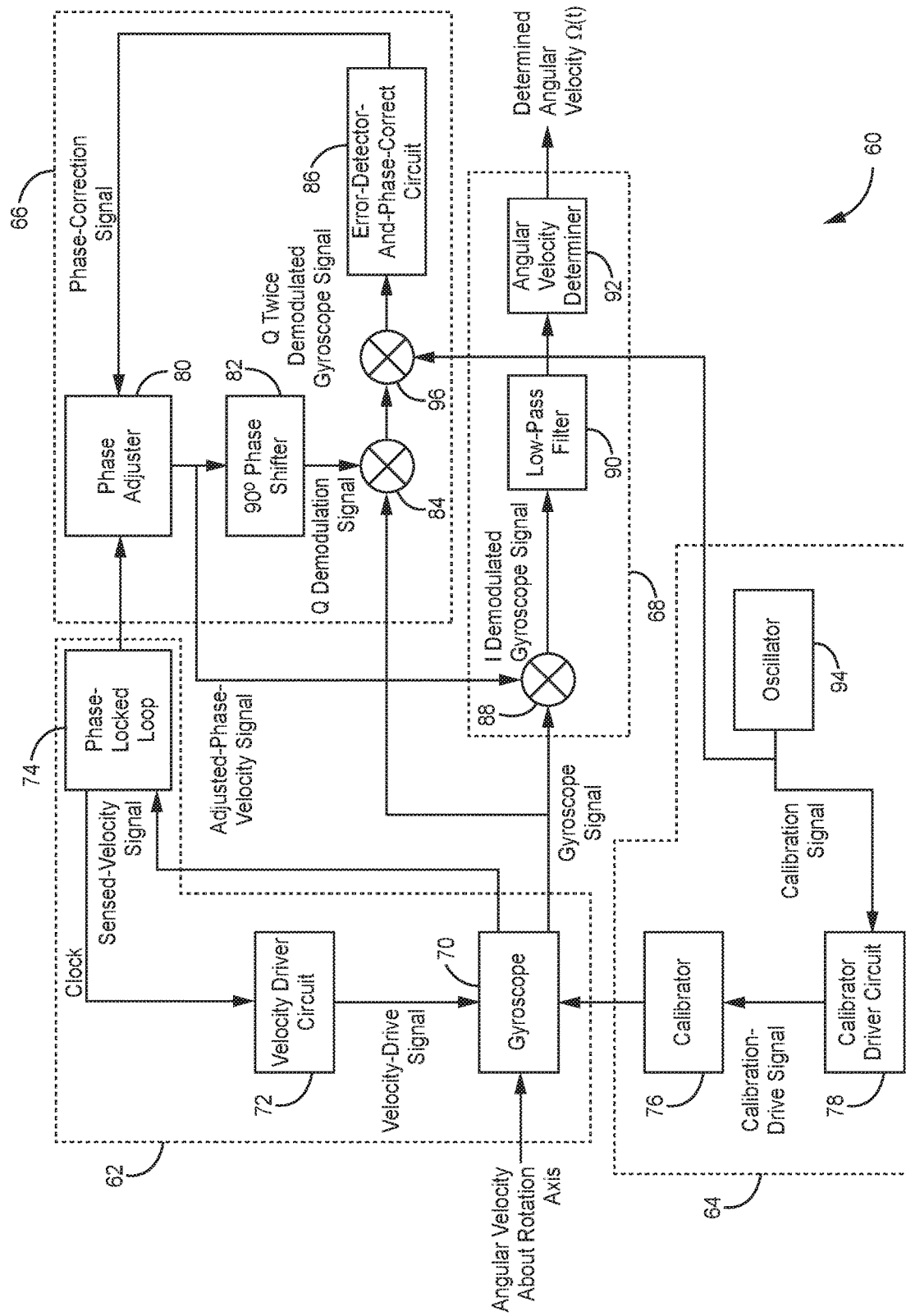
FIG. 8 is a schematic diagram of the gyroscope subsystem of FIG. 6, according to another embodiment.

FIG. 8 is a diagram of the gyroscope subsystem 60 of FIG. 6, according to another embodiment in which the subsystem is configured to determine the angular velocity $\vec{\Omega}(t)$ in response to the gyroscope (deflection) signal from a single proof mass of the gyroscope assembly 62. Because the embodiment of the gyroscope subsystem 60 of FIG. 8 is similar to the embodiment of the gyroscope subsystem 60 of FIG. 7, only the differences of the gyroscope subsystem of FIG. 8 relative to the gyroscope subsystem of FIG. 7 are described.

The calibrator 76 includes a sensor assembly (not shown in FIG. 8) configured to generate a calibration signal having the same phase and frequency as the calibration angular velocity $\vec{\Omega}_{calibrate}(t)$, and includes an oscillator 94 for generating the calibration signal.

And the bias-reducing circuit 66 includes a second mixer 96 configured to demodulate the Q-demodulated gyroscope signal in response to the calibration signal from the oscillator 94 to generate a Q-twice-demodulated gyroscope signal.

Therefore, the second mixer 96 effectively downshifts any component of $\vec{\Omega}_{calibrate}(t)$ in the Q-demodulated gyroscope signal to a zero-frequency (DC) signal, and ideally, when the Q demodulation signal has the frequency and phase of $\vec{V}(t)$ ±90°, the DC level of the Q-twice-demodulated gyroscope signal is zero.

Because of noise and other artifacts that may be superimposed on the Q-twice-demodulated gyroscope signal, the DC component of the Q-twice-demodulated gyroscope signal may not be drivable to zero.

Therefore, the error-detector-and-bias circuit 86 can dither the value of the phase-correction signal to find the value of the phase-correction signal that yields a minimum amplitude of the DC component of the Q twice demodulated gyroscope signal.

Furthermore, the error-detector-and-phase-correct circuit 86 can limit how much it changes the value of the phase-correction signal at any one time to prevent oscillation of, and to thus stabilize, the feedback loop formed by the circuit 86, phase adjuster 80, quadrature phase shifter 92, first mixer 84, and second mixer 96.

The error-detector-and-phase-correct circuit 86 continues to implement the above-described procedure to drive the DC component of the Q-twice-demodulated gyroscope signal to a minimum value, and thereafter to maintain this DC component at its minimum value.

Still referring to FIG. 8, alternate embodiments of the gyroscope subsystem 60 are contemplated. For example, the bias-reducing circuit 66 may include a low-pass filter between the mixer 96 and the error-detector-and-phase-correct circuit 86 filter out non-zero-frequency components. Furthermore, one or more alternate embodiments described above for the gyroscope subsystem 20 of FIG. 3 and the gyroscope subsystem 60 of FIGS. 6-7 can be applicable to the gyroscope subsystem 60 of FIG. 8.

Figure 9:
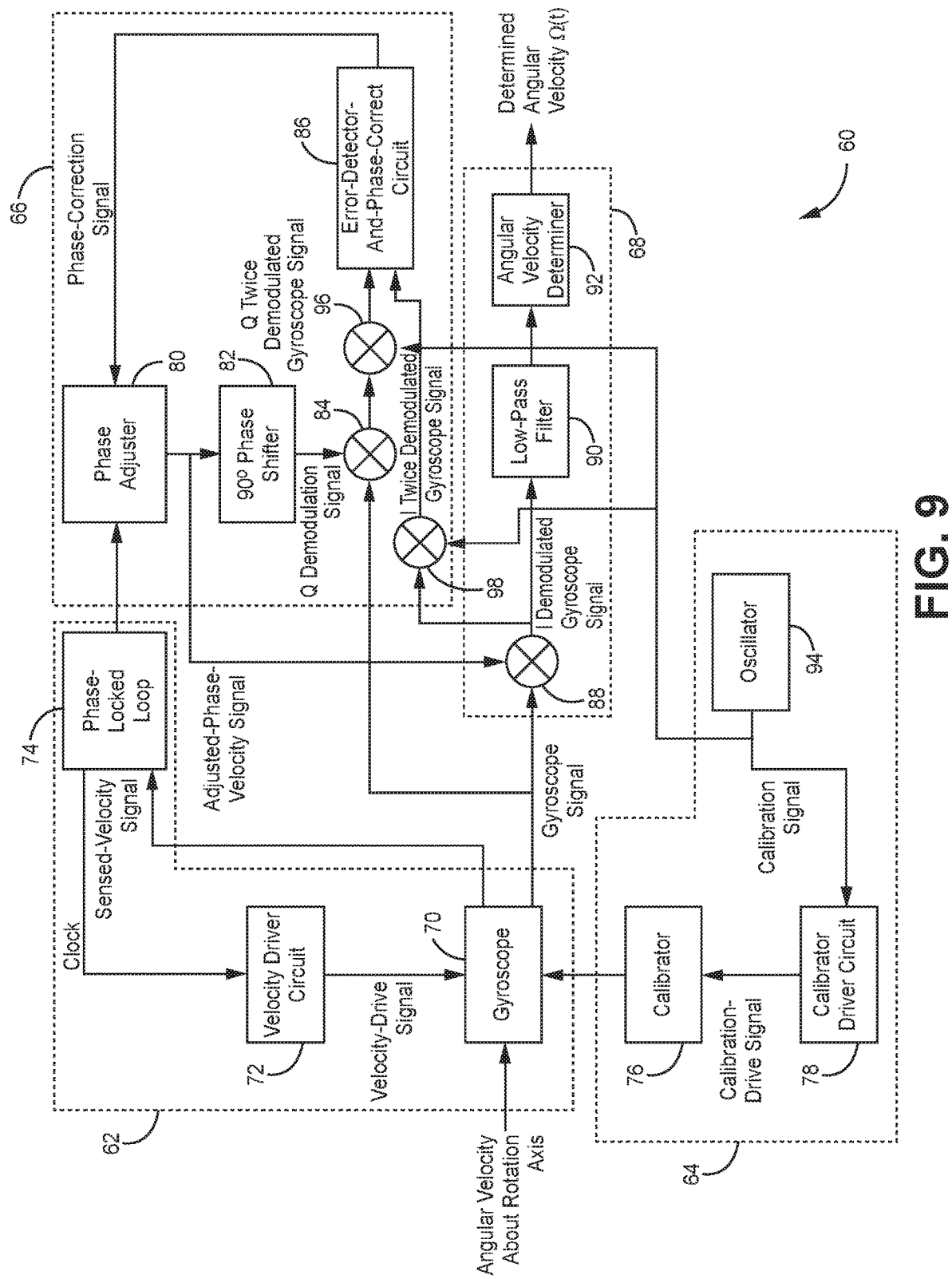
FIG. 9 is a schematic diagram of the gyroscope subsystem of FIG. 6, according to yet another embodiment.

FIG. 9 is a diagram of the gyroscope subsystem 60 of FIG. 6, according to yet another embodiment in which the subsystem is configured to determine the angular velocity $\vec{\Omega}(t)$ in response to the gyroscope (deflection) signal from a single proof mass of the gyroscope assembly 62. Because the embodiment of the gyroscope subsystem 60 of FIG. 9 is similar to the embodiment of the gyroscope subsystem 60 of FIG. 8, only the differences of the gyroscope subsystem of FIG. 9 relative to the gyroscope subsystem of FIG. 8 are described.

The bias-reducing circuit 66 includes a third mixer 98 configured to demodulate the I-demodulated gyroscope signal in response to the calibration signal from the oscillator 94 to generate an I-twice-demodulated gyroscope signal.

Therefore, the third mixer 98 effectively downshifts any component of $\vec{\Omega}_{calibrate}(t)$ in the I-demodulated gyroscope signal to a zero-frequency (DC) signal, and ideally, when the adjusted-phase velocity signal has the frequency and phase of $\vec{V}(t)$, the DC level of the I-twice-demodulated gyroscope signal is at a maximum level. This is because ideally, when the adjusted-phase velocity signal has the frequency and phase of $\vec{V}(t)$, the DC level of the Q-twice-demodulated gyroscope signal is zero because all of the energy due to $\vec{\Omega}_{calibrated}(t)$ is in the I-twice-demodulated gyroscope signal.

The error-detector-and-phase-corrector circuit 68 determines the arctangent of $Q_{twice\_demodulated}/I_{twice\_demodulated}$, and adjusts the phase-correction signal to drive $\arctan(Q_{twice\_demodulated}/I_{twice\_demodulated})$ to, and to maintain $\arctan(Q_{twice\_demodulated}/I_{twice\_demodulated})$ at, zero.

Because of noise and other artifacts that may be superimposed on the Q twice demodulated gyroscope signal, the DC component of the Q-twice-demodulated gyroscope signal, and, therefore, $\arctan(Q_{twice\_demodulated}/I_{twice\_demodulated})$, may never be drivable to zero.

Therefore, the error-detector-and-phase-corrector circuit 86 can dither the value of the phase-correction signal to find the value of the phase-correction signal that yields a minimum value of $\arctan(Q_{twice\_demodulated}/I_{twice\_demodulated})$. Alternatively, the error-detector-and-phase-corrector circuit 86 can determine the value of $\arctan(Q_{twice\_demodulated}/I_{twice\_demodulated})$ while the angular velocity $\vec{\Omega}(t)$ experienced by the gyroscope 70 is zero (e.g., during testing of the gyroscope subsystem 60 when the subsystem is off line), can store this value in a memory (not shown in FIG. 9), and can adjust the phase-correction signal to drive $\arctan(Q_{twice\_demodulated}/I_{twice\_demodulated})$ to, and to maintain $\arctan(Q_{twice\_demodulated}/I_{twice\_demodulated})$ at approximately this stored value.

Furthermore, the circuit 86 can limit by how much it changes the value of the phase-correction signal at any one time to prevent oscillation of, and to thus stabilize, the feedback loop formed by the circuit 86, phase adjuster 80, quadrature phase shifter 82, the first Q mixer 84, the I mixer 88, the second Q mixer 96, and the third Q mixer 98.

The error-detector-and-phase-correct circuit 86 continues to implement the above-described procedure to drive $\arctan(Q_{twice\_demodulated}/I_{twice\_demodulated})$ to zero or to the stored value, and thereafter to maintain $\arctan(Q_{twice\_demodulated}/I_{twice\_demodulated})$ approximately at zero or the stored value.

Still referring to FIG. 9, alternate embodiments of the gyroscope subsystem 60 are contemplated. For example, the bias-reducing circuit 66 may include a first low-pass filter between the mixer 96 and the error-detector-and-phase-corrector circuit 86, and a second low-pass filter between the mixer 98 and the error-detector-and-phase-corrector circuit. Furthermore, one or more alternate embodiments described above for the gyroscope subsystem 20 of FIG. 3 and the gyroscope subsystem 60 of FIGS. 6-8 can be applicable to the gyroscope subsystem 60 of FIG. 9.

Figure 10:
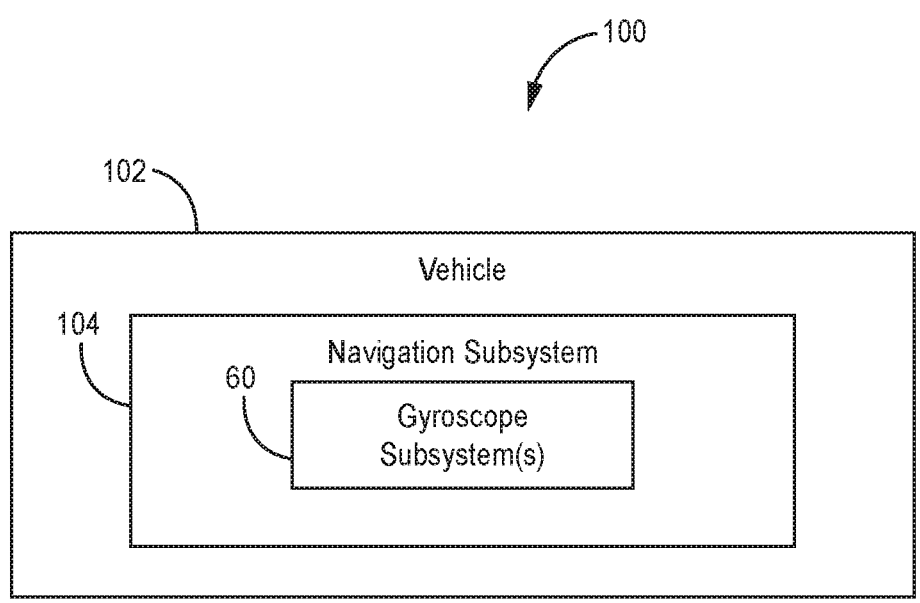
FIG. 10 is a diagram of a system that includes at least one gyroscope subsystem of FIGS. 6-9, according to an embodiment.

FIG. 10 is a diagram of a system 100, which includes at least one of the gyroscope subsystems 20, 40, 50, and 60 of FIGS. 6-9, according to an embodiment. For purposes of example, it is assumed that the system 100 includes three gyroscope subsystems 60 of any one or more of FIGS. 6-9, one gyroscope subsystem per reference-frame axis of rotation (e.g., x-axis, y-axis, z-axis).

The system 100 includes a vehicle 102, a navigation subsystem 104 disposed on the vehicle, and the gyroscope subsystem 60 disposed in, or that is otherwise a part of, the navigation subsystem.

The vehicle 102 can be any type of vehicle, such as a spacecraft, aircraft, watercraft (e.g., ship, submarine), land vehicle (e.g., automobile, truck, tank, train), or drone.

The navigation subsystem 104 can be any type of navigation subsystem that is configured to provide navigation information (e.g., heading, altitude, velocity, pitch, roll, yaw, location, presence of a nearby object) to an operator of the vehicle, or that is configured to pilot the vehicle (e.g., a self-driving car or an autonomous drone).

And the gyroscope subsystems 60 are configured to respectively determine, and to provide to the navigation subsystem 104, the angular velocities (e.g., $\vec{\Omega}_x(t)$, $\vec{\Omega}_y(t)$, and $\vec{\Omega}_z(t)$) about the axes (e.g., x-axis, y-axis, z-axis) of rotation in the frame of reference of the vehicle 102.

Still referring to FIG. 10, alternate embodiments of the system 100 are contemplated. For example, instead of being disposed/installed on a vehicle, the navigation subsystem 104 can be disposed/installed on another subsystem such as a weapon (e.g., a missile). Furthermore, one or more alternate embodiments described above for the gyroscope subsystem 20 of FIG. 3 and the gyroscope subsystem 60 of FIGS. 6-9 can be applicable to the one or more gyroscope subsystems 60 of FIG. 10.

EXAMPLE EMBODIMENTS

Example 1 includes a gyroscope subsystem, comprising: a gyroscope assembly configured to generate a gyroscope signal in response to a calibration angular velocity and another angular velocity about a sense axis; a calibration assembly configured to generate, about the sense axis, the calibration angular velocity; a determining circuit configured to determine the other angular velocity in response to the gyroscope signal; and a bias-reducing circuit configured to reduce a bias component of the determined other angular velocity in response to the gyroscope signal.

Example 2 includes the gyroscope subsystem of any of Examples 1-2 wherein the gyroscope assembly includes a vibratory gyroscope.

Example 3 includes the gyroscope subsystem of any of Examples 1-3 wherein: the gyroscope assembly includes a vibratory gyroscope; and the calibration assembly is configured to impart, to the gyroscope, the calibration angular velocity.

Example 4 includes the gyroscope subsystem of any of Examples 1-4 wherein: the gyroscope assembly includes a gyroscope having at least one proof mass configured to move along a movement axis that is orthogonal to the sense axis, and a sensor configured to generate a movement signal in response to a movement of the at least one proof mass along the movement axis; and the determiner circuit includes a demodulator configured to demodulate the gyroscope signal in response to the movement signal, a low-pass filter configured to reduce a magnitude of a component of the gyroscope signal that corresponds to the calibration angular velocity, and a determiner configured to determine the other angular velocity in response to the filtered gyroscope signal.

Example 5 includes the gyroscope subsystem of any of Examples 1-5 wherein: the gyroscope assembly includes a gyroscope having at least one proof mass configured to move along a movement axis that is orthogonal to the sense axis, and a sensor configured to generate a movement signal in response to a movement of the at least one proof mass along the movement axis; and the bias-reducing circuit is configured to reduce the bias component of the determined other angular velocity in response to the movement signal.

Example 6 includes the gyroscope subsystem of any of Examples 1-6 wherein: the gyroscope assembly includes a gyroscope having at least one proof mass configured to move along a movement axis that is orthogonal to the sense axis, and a sensor configured to generate a movement signal in response to a movement of the at least one proof mass along the movement axis; and the bias-reducing circuit includes a phase adjuster configured to adjust a phase of the movement signal in response to a phase-correction signal, and to provide the adjusted-phase movement signal to the determiner circuit, a quadrature phase shifter configured to shift the phase of the adjusted-phase movement signal, a demodulator configured to demodulate the gyroscope signal in response to the quadrature-phase-shifted movement signal, and a phase corrector configured to generate the phase-correction signal in response to the demodulated gyroscope signal.

Example 7 includes the gyroscope subsystem of any of Examples 1-7 wherein: the gyroscope assembly includes a gyroscope having at least one proof mass configured to move along a movement axis that is orthogonal to the sense axis, and a sensor configured to generate a movement signal in response to a movement of the at least one proof mass along the movement axis; the calibration assembly includes a calibrator configured to generate the calibration angular velocity by moving the gyroscope assembly about the sense axis, and a sensor configured to generate a calibration-movement signal in response to a movement of the gyroscope assembly about the sense axis; and the bias-reducing circuit includes a phase adjuster configured to adjust a phase of the movement signal in response to a phase-correction signal, and to provide the adjusted-phase movement signal to the determiner circuit, a quadrature phase shifter configured to shift the phase of the adjusted-phase movement signal, a first demodulator configured to demodulate the gyroscope signal in response to the quadrature-phase-shifted movement signal, a second demodulator configured to demodulate the demodulated gyroscope signal in response to the calibration-movement signal, and a phase corrector configured to generate the phase-correction signal in response to the demodulated gyroscope signal from the second demodulator.

Example 8 includes the gyroscope subsystem of any of Examples 1-8 wherein: the gyroscope assembly includes a gyroscope having at least one proof mass configured to move along a movement axis that is orthogonal to the sense axis, and a sensor configured to generate a movement signal in response to a movement of the at least one proof mass along the movement axis; the calibration assembly includes a calibrator configured to generate the calibration angular velocity by moving the gyroscope assembly about the sense axis, and a sensor configured to generate a calibration-movement signal in response to a movement of the gyroscope assembly; the determiner circuit includes a first demodulator configured to demodulate the gyroscope signal in response to an adjusted-phase movement signal; and the bias-reducing circuit includes a phase adjuster configured to generated the adjusted-phase movement signal by adjusting a phase of the movement signal in response to a phase-correction signal, a quadrature phase shifter configured to shift the phase of the adjusted-phase movement signal, a second demodulator configured to demodulate the gyroscope signal in response to the quadrature-phase-shifted movement signal, a third demodulator configured to demodulate the demodulated gyroscope signal in response to the calibration-movement signal, a fourth demodulator configured to demodulate the demodulated gyroscope signal from the first demodulator in response to the calibration-movement signal, and a phase corrector configured to generate the phase-correction signal in response to the demodulated gyroscope signals from the third and fourth demodulators.

Example 9 includes a system, comprising: a navigation subsystem, including, a gyroscope subsystem, including, a gyroscope assembly configured to generate a gyroscope signal in response to a calibration angular velocity and another angular velocity about a sense axis; a calibration assembly configured to generate, about the sense axis, the calibration angular velocity; a determining circuit configured to determine the other angular velocity in response to the gyroscope signal; and a bias-reducing circuit configured to reduce a bias component of the determined other angular velocity in response to the gyroscope signal.

Example 10 includes the system of Example 9, further comprising: a vehicle; and wherein the navigation subsystem is disposed on the vehicle.

Example 11 includes the system of any of Examples 10-11 wherein the vehicle includes an aircraft.

Example 12 includes the system of any of Examples 10-12 wherein the vehicle includes a spacecraft.

Example 13 includes the system of any of Examples 10-13 wherein the vehicle includes a land vehicle.

Example 14 includes the system of any of Examples 10-14 wherein the vehicle includes a water vessel.

Example 15 includes a method, comprising: generating, about a sense axis, a calibration angular velocity; generating an angular-velocity signal in response to the calibration angular velocity and another angular velocity about the sense axis; determining the other angular velocity in response to the angular-velocity signal; and reducing an error in the determined other angular velocity in response to the angular-velocity signal.

Example 16 includes the method of any of Examples 15-16 wherein reducing the error includes reducing the error in response to a movement of a mass.

Example 17 includes the method of any of Examples 15-17 wherein the determining includes: demodulating the angular-velocity signal in response to a signal that is related to a movement of a mass in a drive dimension; filtering from the demodulated angular-velocity signal, at least partially, a component that corresponds to the calibration angular velocity; and determining the other angular velocity in response to the filtered angular-velocity signal.

Example 18 includes the method of Example 15, further comprising: generating a movement signal in response to a movement of a mass in a drive dimension; wherein determining the other angular velocity includes determining the other angular velocity in response to an adjusted-phase movement signal; and wherein reducing the error includes generating the adjusted-phase movement signal in response to a phase-correction signal, shifting the phase of the adjusted-phase movement signal by approximately 90°, demodulating the angular-velocity signal in response to the phase-shifted movement signal, and generating the phase-correction signal in response to the demodulated angular-velocity signal.

Example 19 includes the method of any of Examples 15-18, further comprising: generating a movement signal in response to a movement of a mass in a drive dimension; wherein determining the other angular velocity includes determining the other angular velocity in response to an adjusted-phase movement signal; generating a calibration-movement signal in response to the calibration angular velocity; and wherein reducing the error includes generating the adjusted-phase movement signal in response to a phase-correction signal, shifting the phase of the adjusted-phase movement signal by approximately 90°, demodulating the angular-velocity signal in response to the phase-shifted movement signal, demodulating the demodulated angular-velocity signal in response to the calibration-movement signal, and generating the phase-correction signal in response to the twice demodulated angular-velocity signal.

Example 20 includes the method of any of Examples 15-19, further comprising: generating a movement signal in response to a movement of a mass in a drive dimension; wherein determining the other angular velocity includes demodulating the angular-velocity signal in response to an adjusted-phase movement signal; generating a calibration-movement signal in response to the calibration angular velocity; and wherein reducing the error includes generating the adjusted-phase movement signal by adjusting a phase of the movement signal in response to a phase-correction signal, shifting the phase of the adjusted-phase movement signal by approximately 90°, demodulating the angular-velocity signal in response to the phase-shifted movement signal, demodulating, in response to the calibration-movement signal, the angular-velocity signal demodulated in response to the phase-shifted movement signal, demodulating, in response to the calibration-movement signal, the angular-velocity signal demodulated in response to the adjusted-phase movement signal, and generating the phase-correction signal in response to the twice demodulated angular-velocity signals.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A gyroscope subsystem, comprising:
   a gyroscope assembly including a vibratory gyroscope and configured to generate a gyroscope signal in response to a calibration angular velocity and another angular velocity about a sense axis;
   a calibration assembly configured to generate, about the sense axis, the calibration angular velocity;
   a determining circuit configured to determine the other angular velocity in response to the gyroscope signal while the calibration assembly is generating the calibration angular velocity; and
   a bias-reducing circuit configured to reduce a bias component of the determined other angular velocity in response to the gyroscope signal.

2. The gyroscope subsystem of claim 1 wherein the calibration assembly is configured to impart, to the gyroscope, the calibration angular velocity.

3. The gyroscope subsystem of claim 1 wherein:
   the vibratory gyroscope includes at least one proof mass configured to move along a movement axis that is orthogonal to the sense axis; and
   the gyroscope assembly includes a sensor configured to generate a movement signal in response to a movement of the at least one proof mass along the movement axis; and the determining circuit includes
    a demodulator configured to demodulate the gyroscope signal in response to the movement signal,
    a low-pass filter configured to reduce a magnitude of a component of the gyroscope signal that corresponds to the calibration angular velocity, and
    a determiner configured to determine the other angular velocity in response to the filtered gyroscope signal.

4. The gyroscope subsystem of claim 1 wherein:
the vibratory gyroscope includes at least one proof mass configured to move along a movement axis that is orthogonal to the sense axis;
the gyroscope assembly includes a sensor configured to generate a movement signal in response to a movement of the at least one proof mass along the movement axis; and
the bias-reducing circuit is configured to reduce the bias component of the determined other angular velocity in response to the movement signal.

5. The gyroscope subsystem of claim 1 wherein:
the vibratory gyroscope includes at least one proof mass configured to move along a movement axis that is orthogonal to the sense axis;
the gyroscope assembly includes a sensor configured to generate a movement signal in response to a movement of the at least one proof mass along the movement axis; and
the bias-reducing circuit includes
    a phase adjuster configured to adjust a phase of the movement signal in response to a phase-correction signal, and to provide the adjusted-phase movement signal to the determiner circuit,
    a quadrature phase shifter configured to shift the phase of the adjusted-phase movement signal,
    a demodulator configured to demodulate the gyroscope signal in response to the quadrature-phase-shifted movement signal, and
    a phase corrector configured to generate the phase-correction signal in response to the demodulated gyroscope signal.

6. The gyroscope subsystem of claim 1 wherein:
the vibratory gyroscope includes at least one proof mass configured to move along a movement axis that is orthogonal to the sense axis;
the gyroscope assembly includes a sensor configured to generate a movement signal in response to a movement of the at least one proof mass along the movement axis;
the calibration assembly includes
    a calibrator configured to generate the calibration angular velocity by moving the gyroscope assembly about the sense axis, and
    a sensor configured to generate a calibration-movement signal in response to a movement of the gyroscope assembly about the sense axis; and
the bias-reducing circuit includes
    a phase adjuster configured to adjust a phase of the movement signal in response to a phase-correction signal, and to provide the adjusted-phase movement signal to the determiner circuit,
    a quadrature phase shifter configured to shift the phase of the adjusted-phase movement signal,
    a first demodulator configured to demodulate the gyroscope signal in response to the quadrature-phase-shifted movement signal,
    a second demodulator configured to demodulate the demodulated gyroscope signal in response to the calibration-movement signal, and
    a phase corrector configured to generate the phase-correction signal in response to the demodulated gyroscope signal from the second demodulator.

7. The gyroscope subsystem of claim 1 wherein:
the vibratory gyroscope includes at least one proof mass configured to move along a movement axis that is orthogonal to the sense axis;
the gyroscope assembly includes a sensor configured to generate a movement signal in response to a movement of the at least one proof mass along the movement axis;
the calibration assembly includes
    a calibrator configured to generate the calibration angular velocity by moving the gyroscope assembly about the sense axis, and
    a sensor configured to generate a calibration-movement signal in response to a movement of the gyroscope assembly;
the determiner circuit includes a first demodulator configured to demodulate the gyroscope signal in response to an adjusted-phase movement signal; and
the bias-reducing circuit includes
    a phase adjuster configured to generate the adjusted-phase movement signal by adjusting a phase of the movement signal in response to a phase-correction signal,
    a quadrature phase shifter configured to shift the phase of the adjusted-phase movement signal,
    a second demodulator configured to demodulate the gyroscope signal in response to the quadrature-phase-shifted movement signal,
    a third demodulator configured to demodulate the demodulated gyroscope signal in response to the calibration-movement signal,
    a fourth demodulator configured to demodulate the demodulated gyroscope signal from the first demodulator in response to the calibration-movement signal, and
    a phase corrector configured to generate the phase-correction signal in response to the demodulated gyroscope signals from the third and fourth demodulators.

8. A system, comprising:
a navigation subsystem, including,
    a gyroscope subsystem, including,
        a gyroscope assembly including a vibratory gyroscope and configured to generate a gyroscope signal in response to a calibration angular velocity and another angular velocity about a sense axis;
        a calibration assembly configured to generate, about the sense axis, the calibration angular velocity;
        a determining circuit configured to determine the other angular velocity in response to the gyroscope signal while the calibration assembly is generating the calibration angular velocity; and
        a bias-reducing circuit configured to reduce a bias component of the determined other angular velocity in response to the gyroscope signal.

9. The system of claim 8, further comprising:
a vehicle; and
wherein the navigation subsystem is disposed on the vehicle.

10. The system of claim 9 wherein the vehicle includes an aircraft.

11. The system of claim 9 wherein the vehicle includes a spacecraft.

12. The system of claim 9 wherein the vehicle includes a land vehicle.

13. The system of claim 9 wherein the vehicle includes a water vessel.

14. A method, comprising:
generating, about a sense axis of a vibratory gyroscope, a calibration angular velocity;
generating an angular-velocity signal in response to the calibration angular velocity and another angular velocity about the sense axis;
determining the other angular velocity in response to the angular-velocity signal while generating the calibration angular velocity; and
reducing an error in the determined other angular velocity in response to the angular-velocity signal.

15. The method of claim 14 wherein reducing the error includes reducing the error in response to a movement of a mass of the vibratory gyroscope.

16. The method of claim 14 wherein the determining includes:
demodulating the angular-velocity signal in response to a signal that is related to a movement of a mass of the vibratory gyroscope in a drive dimension;
filtering from the demodulated angular-velocity signal, at least partially, a component that corresponds to the calibration angular velocity; and
determining the other angular velocity in response to the filtered angular-velocity signal.

17. The method of claim 14, further comprising:
generating a movement signal in response to a movement of a mass of the vibratory gyroscope in a drive dimension;
wherein determining the other angular velocity includes determining the other angular velocity in response to an adjusted-phase movement signal; and
wherein reducing the error includes
generating the adjusted-phase movement signal in response to a phase-correction signal,
shifting the phase of the adjusted-phase movement signal by approximately 90°,
demodulating the angular-velocity signal in response to the phase-shifted movement signal, and
generating the phase-correction signal in response to the demodulated angular-velocity signal.

18. The method of claim 14, further comprising:
generating a movement signal in response to a movement of a mass of the vibratory gyroscope in a drive dimension;
wherein determining the other angular velocity includes determining the other angular velocity in response to an adjusted-phase movement signal;
generating a calibration-movement signal in response to the calibration angular velocity; and
wherein reducing the error includes
generating the adjusted-phase movement signal in response to a phase-correction signal,
shifting the phase of the adjusted-phase movement signal by approximately 90°,
demodulating the angular-velocity signal in response to the phase-shifted movement signal,
demodulating the demodulated angular-velocity signal in response to the calibration-movement signal, and
generating the phase-correction signal in response to the twice demodulated angular-velocity signal.

19. The method of claim 14, further comprising:
generating a movement signal in response to a movement of a mass of the vibratory gyroscope in a drive dimension;
wherein determining the other angular velocity includes demodulating the angular-velocity signal in response to an adjusted-phase movement signal;
generating a calibration-movement signal in response to the calibration angular velocity; and
wherein reducing the error includes
generating the adjusted-phase movement signal by adjusting a phase of the movement signal in response to a phase-correction signal,
shifting the phase of the adjusted-phase movement signal by approximately 90°,
demodulating the angular-velocity signal in response to the phase-shifted movement signal,
demodulating, in response to the calibration-movement signal, the angular-velocity signal demodulated in response to the phase-shifted movement signal,
demodulating, in response to the calibration-movement signal, the angular-velocity signal demodulated in response to the adjusted-phase movement signal, and
generating the phase-correction signal in response to the twice demodulated angular-velocity signals.

* * * * *